US012524212B2

(12) United States Patent
Sanghi et al.

(10) Patent No.: US 12,524,212 B2
(45) Date of Patent: Jan. 13, 2026

(54) CONTROL OF STORAGE ALIASING VIA AUTOMATIC APPLICATION OF ARTIFICIAL DEPENDENCES DURING PROGRAM COMPILATION

(71) Applicant: NVIDIA Corporation, Santa Clara, CA (US)

(72) Inventors: Malay Sanghi, Pune (IN); Duane Merrill, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 30 days.

(21) Appl. No.: 18/300,955

(22) Filed: Apr. 14, 2023

(65) Prior Publication Data

US 2023/0333825 A1 Oct. 19, 2023

Related U.S. Application Data

(60) Provisional application No. 63/331,778, filed on Apr. 15, 2022.

(51) Int. Cl.
*G06F 8/41* (2018.01)
(52) U.S. Cl.
CPC ...................... *G06F 8/41* (2013.01)
(58) Field of Classification Search
CPC .......................................................... G06F 8/41
See application file for complete search history.

(56) References Cited

U.S. PATENT DOCUMENTS

| | | | | |
|---|---|---|---|---|
| 7,305,665 | B2* | 12/2007 | Koseki | G06F 8/441 717/140 |
| 7,386,844 | B2* | 6/2008 | Heishi | G06F 8/4432 713/320 |
| 7,792,895 | B1 | 9/2010 | Juffa et al. | |
| 7,818,731 | B2* | 10/2010 | Archambault | G06F 8/445 717/157 |
| 8,266,603 | B2* | 9/2012 | Inagaki | G06F 8/441 717/151 |
| 8,302,188 | B2* | 10/2012 | Sato | G06F 21/54 726/22 |
| 8,539,491 | B1* | 9/2013 | Small | G06F 9/5083 718/102 |
| 8,555,267 | B2* | 10/2013 | Makarov | G06F 8/441 717/160 |

(Continued)

*Primary Examiner* — Douglas M Slachta
(74) *Attorney, Agent, or Firm* — Foley & Lardner LLP

(57) ABSTRACT

In various examples, systems and methods are disclosed relating to aliasing control of program variables in storage via automatic application of artificial dependences during program compilation. In some implementations, a system can include a detector to automatically detect a pattern, based at least on a structure of data flow in a source program, indicative of sequences of dependent operations, where the sequences are independent from one another. The system can determine a storage aliasing preference for whether to allow the compiler to allocate the program variables of the respective sequences to the same processor storage locations, or to prevent the compiler from doing so. The system can assign one or more annotations to the source program indicative of one or more artificial dependences for a compiler to respect when performing program transformations prior to the allocation of program variables.

20 Claims, 6 Drawing Sheets

(56) References Cited

U.S. PATENT DOCUMENTS

| | | | | |
|---|---|---|---|---|
| 8,689,198 | B2* | 4/2014 | Kawahito | G06F 8/443 |
| | | | | 717/151 |
| 9,292,294 | B2* | 3/2016 | Al-Otoom | G06F 9/3834 |
| 9,495,168 | B2* | 11/2016 | Rong | G06F 9/3017 |
| 10,089,426 | B2* | 10/2018 | Isshiki | G06F 30/337 |
| 10,346,144 | B2* | 7/2019 | Zhang | G06F 8/433 |
| 10,379,825 | B2* | 8/2019 | Berg | G06F 8/433 |
| 2006/0005194 | A1* | 1/2006 | Kawahara | G06F 8/456 |
| | | | | 718/100 |
| 2007/0277162 | A1* | 11/2007 | Tanaka | G06F 8/4441 |
| | | | | 717/140 |
| 2009/0064112 | A1* | 3/2009 | Inagaki | G06F 8/441 |
| | | | | 717/140 |
| 2013/0113809 | A1 | 5/2013 | Kong et al. | |
| 2013/0160133 | A1* | 6/2013 | Avgerinos | G06F 21/602 |
| | | | | 726/26 |
| 2013/0305258 | A1 | 11/2013 | Durant | |
| 2014/0181475 | A1* | 6/2014 | Abdallah | G06F 9/3891 |
| | | | | 712/207 |
| 2016/0162402 | A1 | 6/2016 | Woolley et al. | |
| 2016/0299998 | A1* | 10/2016 | Isshiki | G06F 30/3308 |
| 2017/0357512 | A1* | 12/2017 | Landers | G06F 9/3836 |
| 2018/0032344 | A1* | 2/2018 | Smith | G06F 9/3856 |
| 2018/0137081 | A1* | 5/2018 | Abdallah | G06F 9/30123 |
| 2022/0300326 | A1 | 9/2022 | Merrill | |

* cited by examiner

CONTROL OF STORAGE ALIASING VIA AUTOMATIC APPLICATION OF ARTIFICIAL DEPENDENCES DURING PROGRAM COMPILATION

CROSS-REFERENCE TO RELATED APPLICATIONS

The present application claims the benefit of and priority to U.S. Provisional Application No. 63/331,778, filed Apr. 15, 2022, the disclosure of which is incorporated herein by reference in its entirety.

BACKGROUND

Parallel processing systems, such as graphics processing units (GPUs) and other computer devices, can use compilers to convert source code into machine code for execution by the GPUs. The compilers can include code optimizers that automatically adjust scheduling of operations and/or allocation of operations to registers, in order to meet various criteria for code execution. However, the optimizers may adjust the scheduling and allocation in a manner that may result in suboptimal performance for at least some types of computations.

SUMMARY

Embodiments of the present disclosure relate to systems and methods for control of storage aliasing via automatic application of artificial dependences during program compilation, including but not limited to allow for acceleration of programs implemented on parallel processing systems and units, such as graphics processing units (GPUs). In contrast to conventional systems, such as those described above, systems and methods in accordance with the present disclosure can detect computer operations that can benefit from being ordered for allocation to memory resources, such as registers, according to artificial dependences amongst the operations. The systems and methods can implement the artificial dependences up to allocation of the operations to registers. Various such solutions can improve code execution performance, such as by reducing overall cycles or other metrics for executing the operations of the source code.

At least one aspect relates to a processor. The processor can include one or more circuits to determine, based at least on a source program comprising a plurality of operations, a structure of data flow of the plurality of operations. The one or more circuits can detect, based at least on the structure of data flow, at least one pair of dependence relationships among the plurality of operations comprising (i) a first relationship in which at least one second operation of the plurality of operations references a first subset of one or more program variables defined by at least one first operation of the plurality of operations, and (ii) a second relationship in which at least one fourth operation of the plurality of operations references a second subset of one or more program variables defined by at least one third operation, and (iii) wherein the plurality of operations of the first relationship are independent of the plurality of operations of the second relationship. The one or more circuits can determine, based at least on the structure of data flow, a storage aliasing preference (e.g., one or more modes, procedures, or policies of storage and/or storage aliasing) for a compiler to (a) be allowed to allocate the first subset of one or more program variables to a plurality of first processor storage locations and to allocate the second subset of one or more program variables to the plurality of first processor storage locations, or (b) allocate the first subset of one or more program variables to the plurality of first processor storage locations and allocate the second subset of one or more program variables to a plurality of second processor storage locations different from the plurality of first storage locations. The one or more circuits can insert into the program one or more artificial dependences among the otherwise independent operations in a manner that satisfies the storage aliasing preference. The one more artificial dependences cause the compiler to allocate the first subset of one or more program variables and the second subset of one or more program variables according to the storage aliasing preference.

In some implementations, the at least one first operation includes a plurality of first operations. In some implementations, the at least one second operation includes a plurality of second operations. The plurality of operations can include a matrix-matrix multiplication. The one or more circuits can determine the storage aliasing preference according to a schedule of load operations and multiplication operations of the matrix-matrix multiplication. The source program can include at least one of a source code file or a data structured generated by processing of the source code file by the compiler.

In some implementations, the one or more circuits can arrange the plurality of operations in a linear order to have an overlap of a live range of a plurality of program variables of the one or more program variables, wherein the overlap corresponds to the storage aliasing preference. The one or more circuits can assign, responsive to arranging the plurality of operations in the linear order, at least one artificial dependence as an artificial ordering dependence amongst the linear order to cause the compiler to allocate, according to the storage aliasing preference, the first subset of one or more program variables and the second subset of one or more program variables. In some implementations, the one or more circuits can allow the compiler to allocate the first subset of one or more program variables to the plurality of first processor storage locations, and can allocate the second subset of one or more program variables to the plurality of first processor storage locations by assigning the at least one artificial ordering dependence to separate at least one of (a) the at least one second operation from the at least one third operation or (b) the at least one first operation from the at least one fourth operation. In some implementations, the one or more circuits can cause the compiler to allocate the first subset of one or more program variables to the plurality of first processor storage locations and can cause the compiler to allocate the second subset of one or more program variables to the plurality of second processor storage locations by assigning the at least one artificial ordering dependence to separate the at least one first operation from the at least one third operation and separate the at least one second operation from the at least one fourth operation.

In some implementations, the one or more circuits are to cause the compiler to discard the artificial dependence subsequent to performing the allocation. The compiler can modify an order of the plurality of operations, according to a timing criterion for execution operations, subsequent to performing the allocation.

In some implementations, the plurality of first processor storage locations and the plurality of second processor storage locations are provisioned by a compilation target. The plurality of first processor storage locations and the plurality of second processor storage locations can include a plurality of registers. The plurality of first processor storage locations and the plurality of second processor storage locations can include a plurality of locations in a stack frame. The compilation target can include a graphics processing unit (GPU) configured to execute the plurality of operations.

In some implementations, the one or more circuits are to determine the storage aliasing preference according to at least one of (i) a type of one or more operations of the plurality of operations, (ii) a quantity of processor storage locations provisioned by a compilation target, or (iii) a timing characteristic of one or more operations of the plurality of operations.

At least one aspect relates to a system. The system can include one or more processing units to execute operations including determining, based at least on a source program comprising a plurality of operations, a data flow of the plurality of operations. The one or more processing units can detect, based at least on the data flow, at least one pair of dependence relationships among the plurality of operations comprising (i) a first relationship in which at least one second operation of the plurality of operations references a first subset of one or more program variables defined by at least one first operation of the plurality of operations, and (ii) a second relationship in which at least one fourth operation of the plurality of operations references a second subset of one or more program variables defined by at least one third operation, and (iii) wherein the plurality of operations of the first relationship are independent of the plurality of operations of the second relationship. The one or more processing units can determine, based at least on the structure of data flow, a storage aliasing preference for a compiler to (a) be allowed to allocate the first subset of one or more program variables to a plurality of first processor storage locations and to allocate the second subset of one or more program variables to the plurality of first processor storage locations, or (b) allocate the first subset of one or more program variables to the plurality of first processor storage locations and allocate the second subset of one or more program variables to a plurality of second processor storage locations different from the plurality of first storage locations. The one or more processing units can insert into the program one or more artificial dependences among the otherwise independent operations in a manner that satisfies the storage aliasing preference. The one more artificial dependences cause the compiler to allocate the first subset of one or more program variables and the second subset of one or more program variables according to the storage aliasing preference.

In some implementations, the at least one first operation includes a plurality of first operations. In some implementations, the at least one second operation includes a plurality of second operations. The plurality of operations can include a matrix-matrix multiplication. The one or more processing units can determine the storage aliasing preference according to a schedule of load operations and multiplication operations of the matrix-matrix multiplication. The source program can include at least one of a source code file or a data structured generated by processing of the source code file by the compiler.

In some implementations, the one or more processing units can arrange the plurality of operations in a linear order to have an overlap of a live range of a plurality of program variables of the one or more program variables, wherein the overlap corresponds to the storage aliasing preference. The one or more processing units can assign, responsive to arranging the plurality of operations in the linear order, at least one artificial dependence as an artificial ordering dependence amongst the linear order to cause the compiler to allocate, according to the storage aliasing preference, the first subset of one or more program variables and the second subset of one or more program variables. In some implementations, the one or more processing units can allow the compiler to allocate the first subset of one or more program variables to the plurality of first processor storage locations, and can allocate the second subset of one or more program variables to the plurality of first processor storage locations by assigning the at least one artificial order dependence to separate at least one of (a) the at least one second operation from the at least one third operation or (b) the at least one first operation from the at least one fourth operation. In some implementations, the one or more processing units can cause the compiler to allocate the first subset of one or more program variables to the plurality of first processor storage locations and can cause the compiler to allocate the second subset of one or more program variables to the plurality of second processor storage locations by assigning the at least one artificial order dependence to separate the at least one first operation from the at least one third operation and separate the at least one second operation from the at least one fourth operation.

In some implementations, the one or more processing units are to cause the compiler to discard the artificial dependence subsequent to performing the allocation. The compiler can modify an order of the plurality of operations, according to a timing criterion for execution operations, subsequent to performing the allocation.

In some implementations, the plurality of first processor storage locations and the plurality of second processor storage locations are provisioned by a compilation target. The plurality of first processor storage locations and the plurality of second processor storage locations can include a plurality of registers. The plurality of first processor storage locations and the plurality of second processor storage locations can include a plurality of locations in a stack frame. The compilation target can include a graphics processing unit (GPU) configured to execute the plurality of operations.

In some implementations, the one or more processing units are to determine the storage aliasing preference according to at least one of (i) a type of one or more operations of the plurality of operations, (ii) a quantity of processor storage locations provisioned by a compilation target, or (iii) a timing characteristic of one or more operations of the plurality of operations.

At least one aspect relates to a method. The method can include determining, by one or more processors, using a source program comprising a plurality of operations, a data flow of the plurality of operations. The method can include detecting, by the one or more processors, based at least on the data flow, at least one pair of dependence relationships among the plurality of operations comprising (i) a first relationship in which at least one second operation of the plurality of operations references a first subset of one or more program variables defined by at least one first operation of the plurality of operations, and (ii) a second relationship in which at least one fourth operation of the plurality of operations references a second subset of one or more program variables defined by at least one third operation, and (iii) wherein the plurality of operations of the first relationship are independent of the plurality of operations of the second relationship. The method can include determining, based at least on the structure of data flow, an artificial dependence for a compiler to (a) be allowed to allocate the first subset of one or more program variables to a plurality of first processor storage locations and to allocate the second subset of one or more program variables to the plurality of first processor storage locations, or (b) allocate the first subset of one or more program variables to the plurality of first processor storage locations and allocate the second subset of one or more program variables to a plurality of second processor storage locations different from the plurality of first storage locations. The method can include causing the compiler to insert into the program one or more artificial dependences among the otherwise independent operations in a manner that satisfies the storage aliasing preference. The one more artificial dependences can cause the compiler to allocate the first subset of one or more program variables and the second subset of one or more program variables according to the storage aliasing preference.

In some implementations, the at least one first operation includes a plurality of first operations. In some implementations, the at least one second operation includes a plurality of second operations. The plurality of operations can include a matrix-matrix multiplication. The method can include determining the storage aliasing preference, the annotation, and/or the artificial dependence according to a schedule of load operations and multiplication operations of the matrix-matrix multiplication. The source program can include at least one of a source code file or a data structured generated by processing of the source code file by the compiler.

In some implementations, the method includes arranging the plurality of operations in a linear order to have an overlap of a live range of a plurality of program variables of the one or more program variables, wherein the overlap corresponds to the storage aliasing preference. The method can include assigning, responsive to arranging the plurality of operations in the linear order, at least one artificial dependence as an artificial ordering dependence amongst the linear order to cause the compiler to allocate, according to the storage aliasing preference, the first subset of one or more program variables and the second subset of one or more program variables. In some implementations, the method includes allowing the compiler to allocate the first subset of one or more program variables to the plurality of first processor storage locations, and can allocate the second subset of one or more program variables to the plurality of first processor storage locations by assigning the at least one artificial ordering dependence to separate at least one of (a) the at least one second operation from the at least one third operation or (b) the at least one first operation from the at least one fourth operation. In some implementations, the method includes causing the compiler to allocate the first subset of one or more program variables to the plurality of first processor storage locations and can include causing the compiler to allocate the second subset of one or more program variables to the plurality of second processor storage locations by assigning the at least one artificial ordering dependence to separate the at least one first operation from the at least one third operation and separate the at least one second operation from the at least one fourth operation.

In some implementations, the method includes causing the compiler to discard the artificial dependence subsequent to performing the allocation. The compiler can modify an order of the plurality of operations, according to a timing criterion for execution operations, subsequent to performing the allocation.

In some implementations, the plurality of first processor storage locations and the plurality of second processor storage locations are provisioned by a compilation target. The plurality of first processor storage locations and the plurality of second processor storage locations can include a plurality of registers. The plurality of first processor storage locations and the plurality of second processor storage locations can include a plurality of locations in a stack frame. The compilation target can include a graphics processing unit (GPU) configured to execute the plurality of operations.

In some implementations, the method can include determining the storage aliasing preference according to at least one of (i) a type of one or more operations of the plurality of operations, (ii) a quantity of processor storage locations provisioned by a compilation target, or (iii) a timing characteristic of one or more operations of the plurality of operations.

The processors, systems, and/or methods described herein can be implemented by, or included in at least one of a system for performing simulation operations; a system for performing digital twin operations; a system for performing light transport simulation; a system for performing collaborative content creation for 3D assets; a system for performing deep learning operations; a system implemented using an edge device; a system for generating or presenting virtual reality (VR) content, augmented reality (AR) content, and/or mixed reality (MR) content; a system for performing conversational AI operations; a system for generating synthetic data; a system implemented using a robot; a system associated with an autonomous or semi-autonomous machine (e.g., an in-vehicle infotainment system); a system for performing generative AI operations; a system at least partially implemented or developed using a collaborative content creation platform; a system for performing operations using one or more language models; a system incorporating one or more virtual machines (VMs); a system implemented at least partially in a data center; or a system implemented at least partially using cloud computing resources.

BRIEF DESCRIPTION OF THE DRAWINGS

The present systems and methods for automatic operation ordering for graphics processing units and related applications are described in detail below with reference to the attached drawing figures, wherein.

DETAILED DESCRIPTION

Figure 1:
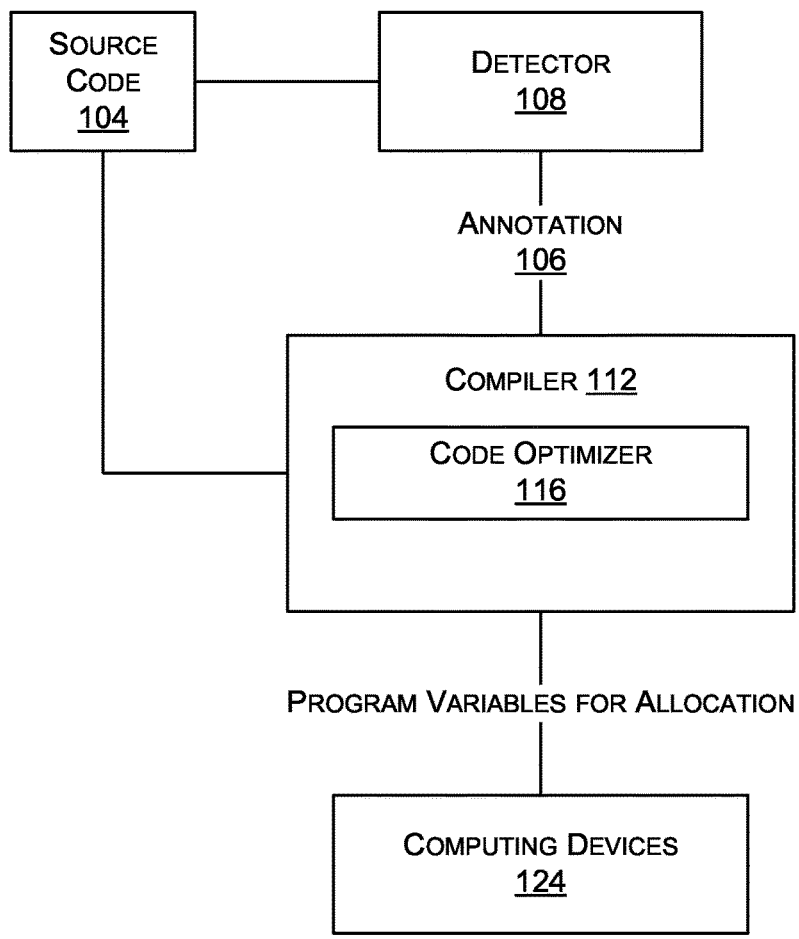
FIG. 1 is a block diagram of an example system for storage aliasing during program compilation, in accordance with some embodiments of the present disclosure.

Systems and methods are disclosed related to automatic artificial dependence application during program compilation, such as for accelerating computing on parallel processing units, such as graphics processing units (GPUs). GPUs (for example, as well as other parallel processing units or systems and in-order computing systems) can process operations in order. For example, GPUs can assign operations, such as memory operations (e.g., loading data into a register or other memory for use by one or more processors of the GPU; storing data in memory or other storage units) to a pipeline of operations, such as a pipeline represented by machine code for execution by one or more threads of the GPU. For example, GPUs and other in-order machines can issue a sequence of instructions (e.g., instructions to perform operations represented by source code/machine code) to execution units in an execution core of the GPU; since the execution time (e.g., latency) of an instruction may be longer than one clock cycle, the execution units can be implemented in a pipelined fashion so that a second instruction can be issued before all preceding instructions have finished, as long as the second instruction does not require data resulting from the execution of an instruction that has not finished. This may be useful, for example, when using GPUs to perform computations for rendering or generating display data, such as for displaying video frames according to frame rate criteria (e.g., 30 frames per second; 60 frames per second), including but not limited to instances in which each frame's display data may be rendered independently.

Due to their architecture and computational capacity, including having architecture for supporting parallel processing of multiple threads of instructions/operations, GPUs can be effective for performing various forms of computations. For example, GPUs can be effective and efficient for executing matrix and/or linear algebra operations, such as matrix multiplication; machine learning operations; or various combinations thereof. However, due to the code optimizers that GPUs implement for converting source code into machine code (which may be useful for satisfying frame rate criteria or other criteria associated with generating display data), GPUs may still not meet expected performance criteria (e.g., measured time to execute a program relative to the GPU's specified throughput, etc.) for various such computations.

Systems and methods in accordance with the present disclosure can detect one or more operations in source code that are indicative of operation sequences that can have improved execution and performance (e.g., can be accelerated) by applying artificial dependences for controlling how the operations are ordered, such as for program compilation and/or allocation of program variables (e.g., data elements) to resources, such as storage locations of processors (e.g., registers; locations of stack frames; physical memory resources of processors, such as GPU processors and/or GPU cores, etc.). For example, operations can be identified in the source code that include multiple, independent sequences of operations, where each sequence includes dependent operations (e.g., at least one operation of the sequence depends on another operation of the sequence). The system can assign a label (e.g., annotation, flag, etc.) to the source code, or a representation thereof, such as a modification of the source code as part of a process of lowering the source code down to machine code by the compiler, such as to identify the operations and the artificial dependence for the operations and/or data elements referenced by or otherwise used by the operations. The compiler can allocate the data elements to storage locations according to an order represented by the artificial dependence, which can allow for more efficient allocation and/or overall resource usage.

For example, the source code can represent a program (e.g., kernel) that includes multiple operations (e.g., operations to be applied to data elements), in which some of the operations are independent, and the independent operations each depend on other operations (e.g., to form independent sequences of dependent operations). As an example, such a program may include a loop in which data is to be loaded from memory (e.g., into one or more registers), then processed by one or more computations (e.g., by matrix operations, such as matrix-matrix operations). As such, the overall sequence of operations for the loop can include a sequence of load-compute-load-compute-load-compute operations (e.g., loading and computing in each iteration of the loop; additional operations, such as storing the result of the add, can also be included in the loop; the operations may not necessarily include load operations). Each pair of load-compute operations may be independent from the other pairs of load-compute operations, such as to form independent sequences of dependent operations. The loop may also include multiple compute operations (e.g., multiple matrix operations), and some of the compute operations may depend on those of previous iterations. In some such instances, the code compiler (and/or instruction scheduler) can arrange or rearrange the ordering of allocation of the data elements to storage locations in various manners that may comply with performance criteria that the code compiler operates to achieve. While this may be useful for some programs for the GPU to execute, other programs, such as programs that perform matrix computations and/or machine learning computations, may not benefit from such rearrangement; for example, the rearrangement may increase the total number of cycles if the period during which loading is being performed is not being used to perform other operations simultaneously. Systems and methods in accordance with the present disclosure can detect patterns of operations (e.g., patterns of independent sequences of dependent operations), and assign artificial dependences amongst the operations in a manner that allows the compiler to more effectively allocate data elements to storage locations. This can allow for improved performance, including but not limited to by reducing the total number of cycles used to execute a program.

The system can assign the artificial dependence to the source code prior to the compiler allocating operations to registers. For example, the system can assign the artificial dependence as an annotation (e.g., compiler-readable label) to the source code. The compiler can be implemented/configured to identify the annotation and process the source code according to the artificial dependence, such as to allocate data elements to registers in an order corresponding to the artificial dependence. The artificial dependence can represent, for example and without limitation, a requirement for the compiler to allocate one or more first data elements to different storage locations than one or more second data elements, where the first data elements are used (e.g., defined, referenced, manipulated, etc.), by operations of a first sequence (e.g., pair, group, etc., of dependent operations) that is independent from (e.g., does not have dependence on) operations of a second sequence that uses the one or more second data elements, such as to allow for concurrent allocation of data elements. The artificial dependence can represent a permission for the compiler to allocate first and second data elements to the same (or different) storage locations, such as to allow for serialization.

In some implementations, the detection of the structure of data flow in the program (e.g., source program, source code) indicative of the artificial dependence and/or the assignment of the instruction regarding the artificial dependence to the source program (or a representation thereof, such as a linearized order of the plurality of operations) can be performed in a manner that is abstracted from a user or other programmer or preparer of the source program. By assigning the instruction to the source code subsequent to output of the source code and/or subsequent to the source code being provided to the compiler, the manner in which the detection and/or assignment processes are performed can be modified without affecting the source code development and generation process. For example, the detection and/or assignment processes (e.g., pattern detection processes) can be updated, or customized according to various characteristics of the source code (e.g., based on identifying coding libraries used by the source code), or of the GPU or other processing hardware.

The systems and methods described herein may be used for a variety of purposes, by way of example and without limitation, for model training, perception, augmented reality, virtual reality, mixed reality, security and surveillance, robotics, autonomous or semi-autonomous machine applications, synthetic data and map generation, machine control, machine locomotion, machine driving, simulation and digital twinning, deep learning, environment simulation, object or actor simulation and/or digital twinning, data center processing, conversational AI, (large) language models (LLMs), light transport simulation (e.g., ray-tracing, path tracing, etc.), collaborative content creation for 3D assets, cloud computing and/or any other suitable applications.

Disclosed embodiments may be comprised in a variety of different systems such as systems for performing deep learning operations, systems for performing simulation operations, systems for performing digital twin operations, systems implemented using a robot, systems for performing synthetic data generation operations, automotive systems (e.g., a control system for an autonomous or semi-autonomous machine, a perception system for an autonomous or semi-autonomous machine), aerial systems, medical systems, boating systems, smart area monitoring systems, systems implemented using an edge device, systems incorporating one or more virtual machines (VMs), systems implemented at least partially in a data center, systems for performing conversational AI operations, systems for performing generative AI operations (e.g., with one or more language models or LLMs), systems for performing light transport simulation, systems for performing collaborative content creation for 3D assets, systems implemented at least partially using cloud computing resources, and/or other types of systems.

FIG. 1 is an example computing environment including a system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 or components thereof can include any function, model (e.g., machine learning model, neural network, data representation of an environment or object or agent in the environment), operation, rules, heuristics, algorithms, routine, logic, or instructions to perform functions such as automatically applying artificial dependences for program compilation responsive to processing source code, such as to accelerate computations performed in parallel computing environments, including but not limited to accelerating matrix multiplications in loops.

Various aspects of the system 100 can be implemented by one or more devices or systems that can be communicatively coupled with one another by various physical and/or logical connections. For example, the system 100 can be at least partially implemented using one or more central processing units (CPUs), GPUs, general-purpose computing on GPU (GPGPU) systems, parallel computing systems, multiple core computing systems, or various combinations thereof. For example, one or more components of the system 100 can be implemented using a CPU coupled with one or more GPUs. The system 100 can be at least partially implemented as an in-order machine, in which the system 100 executes operations in an order represented by machine code (though the instructions may be completed out of order relative to when their execution is initiated, due to varying durations (e.g., number of cycles) used to complete the instructions).

The system 100 can include or receive at least one source code 104. The source code 104 can include a data structure, such as a text file data structure, having one or more instructions representing operations (e.g., commands) to be executed by computing resources of the system 100 (e.g., computing devices 124). The source code 104 can include text written in a human-readable programming language, including but not limited to C or C++. The source code 104 can represent a source program.

The source code 104 can include one or more operations. The source code 104 can include text representing the operations, such as text indicating instructions to cause computing resources of the system 100 (e.g., computing devices 124 or processors thereof, etc.) to execute to perform the operations. The operations can include, for example and without limitation, memory operations and compute operations (e.g., computations). The operations can be executed to use program variables (e.g., data elements and/or symbolic representations of data elements or combinations thereof), including but not limited to defining, referencing, and/or manipulating program variables. The memory operations can include any form of commands for loading, and/or storing one or more data elements. The data elements can include any of various types of data used by computing systems. For example, the memory operations can include commands for loading a data element by retrieving the data from a first type of data storage (e.g., permanent storage; main memory, global memory, etc.) and assigning the data element to a second type of data storage (e.g., memory of a given GPU 124, local memory, etc.). The memory operations can include commands for storing a data element in various such types of data storage. The memory operations can include commands for loading data elements into a register (e.g., physical memory resources of a processor) from another memory resource.

The computations can include any variety of operation for manipulating data elements or values thereof, at any of various levels of abstraction, higher-level function, or generalization relative to machine-level operations that the computing devices 124 or other hardware of the system 100 execute. The computations can include, for example and without limitation, addition, subtraction, multiplication, division, or comparison operations, including computations that can be applied to any of various data types of the source code 104, including but not limited to arrays, vectors, matrices, tensors, or other data types defined at higher levels than numerical variables.

The source code 104 can include one or more loops. The loop can represent instructions for repeating one or more operations identified by or assigned to the loop. For example, the loop can define a condition which, while satisfied, causes one or more operations identified by the loop to be performed (e.g., in a given iteration). As such, for each iteration of the condition of the loop being satisfied, operations identified by the loop can be executed. The loops can include, for example and without limitation, any or all of one or more for loops, one or more while loops, one or more do-while loops, etc.

The source code 104 can have the operations arranged in a written order, such as a human-readable order represented by the lines of code reciting the operations. The order can be indicative of intent of a programmer for how operations should be performed, including but not limited to how various memory and processor resources of the system 100 are expected to be used in order to achieve various performance considerations. For example, in some instances, the source code 104 may be configured (e.g., written, organized, etc., by a user or other code generator) in view of performance considerations including, for example and without limitation, register footprint, memory-level parallelism, and/or occupancy. The register footprint can represent an amount of register resources (e.g., relatively small and/or fast memory resources of the computing devices 124) being used. The parallelism can represent an extent to which memory resources (e.g., distinct from registers, such as automatic storage) are used (in parallel) to support data holding and processing. The occupancy can represent a number of warps (e.g., processing threads) used by the GPU 124 relative to a maximum number of warps. In some instances, it may be useful for a program to rely on relatively low register resources, and relatively high occupancy, such as to perform loading and computation operations interspersed with one another (e.g., load-add-load-add etc., as described below for Example Program 1). In some instances, it may be useful for a program to rely on relatively high memory-level parallelism, and relatively low occupancy, such as to perform loading operations first and computation operations after the loading operations (e.g., load-load-load-add-add-add, etc.). Various such considerations may depend on compute times (e.g., numbers of cycles) used for performing memory operations and for performing computing operations, including where the memory operations and/or the computing operations are provided in a loop or other iterative configuration. The source code 104 may be prepared in a manner that explicitly represents any of various such considerations, or the system 100 (e.g., by processing the source code 104 to detect (e.g., determine) patterns for assign artificial dependences) can perform processes such as allocation of operations to registers in a manner that achieves various such considerations, such as to take advantage of the ability of registers to be used to support independent operations in parallel (e.g., prior to the instruction scheduler directing operations to processors for execution).

Example Program 1, in source code representation below, provides an example of a program for summing data of an array, targeted for relatively low register footprint, and relatively high occupancy. For example, Example Program 1 is written to have a single temporary variable ("temp") for iteratively accumulating data from global memory, which is then used for the add operations for determining a total of the values of the d_in variable; as such, Example Program 1 is written in a load-add-load-add configuration:

Example Program 1 (Source Code Representation)

```
template <int N>
___global___ void ThreadReduce1(float *d_in, float *d_out)
{
    // one temporary
    float temp;
    // Initialize accumulator
    float total = 0.0;
    // Iteratively accumulate data from global memory, computing a sum
    #pragma unroll
    for (int i = 0; i < N; ++i)
    {
        temp = d_in[i];
        total += temp;
    }
    // Write out to global memory
    *d_out = total;
}
```

Example Program 2, in source code representation below, provides an example of a program performing similar operations as Example Program 1, while targeted for relatively high memory-level parallelism and relatively low occupancy. For example, Example Program 2 is written to have an N-sized array of temporary variables for accumulating data from global memory into automatic storage, which is then used (e.g., consumed) for the add operations for determining the total of the values in the d_in variable; as such, Example Program 2 is written in a load-load-load-add-add-add configuration:

Example Program 2 (Source Code Representation)

```
template <int N>
___global___ void ThreadReduce2(float *d_in, float *d_out)
{
    // N temporaries
    float temps[N];
    // Initialize accumulator
    float total = 0.0;
    // First, move all data from global memory into automatic storage
    #pragma unroll
    for (int i = 0; i < N; ++i)
        temps[i] = d_in[i];
    // Then consume all data in automatic storage, computing a sum
    #pragma unroll
    for (int i = 0; i < N; ++i)
        total += temps[i];
    // Write out to global memory
    *d_out = total;
}
```

As described further herein, the system 100 can include a compiler 112, which can generate machine code for execution by the one or more computing devices 124, according to the source code 104; the compiler 112 can include a code optimizer 116 that can modify the source code 104 as part of generating the machine code, including arranging the order in which operations represented by the source code 104 are allocated to registers and/or provided in the machine code for execution. In some instances, the code optimizer 116 can control the ordering of operations of the source code 104 in a manner that affects performance considerations including but not limited to register footprint, occupancy, and/or parallelism; various such modifications may affect the number of clock cycles for executing the operations.

For instance, Example Program 1, shown below in an intermediate representation used by the compiler 112, provides an example of the source code 104 of Example Program 1 having been at least partially processed by the compiler 112 and/or the code optimizer 116 (e.g., subsequent to variable naming/renaming). In the example shown below, the code optimizer 116 has scheduled the operations such that the operations are in a load-load-load . . . add-add-add order, rather than load-add-load-add-load-add as in the source code 104 of Example Program 1 shown above (and similar to the order of operations in the intermediate representation of Example Program 2 shown further below):

Example Program 1 (Intermediate Representation)

| Inst# | BB# | MaxLive | |
|---|---|---|---|
| [1] | [−1] | | FUNC = F0 |
| [2] | [0] | | LABEL = L0(CONV)(cohesiveid:0) |
| [77] | [0] | 2r | MOV.UL vr72d = C[0][0 + 352].x |
| [12] | [0] | 3r | READ.F vr74 = GMEM.x[vr72d] |
| [17] | [0] | 4r | READ.F vr79 = GMEM.x[vr72d + 4] |
| [22] | [0] | 5r | READ.F vr84 = GMEM.x[vr72d + 8] |
| [27] | [0] | 6r | READ.F vr89 = GMEM.x[vr72d + 12] |
| [32] | [0] | 7r | READ.F vr94 = GMEM.x[vr72d + 16] |
| [37] | [0] | 8r | READ.F vr99 = GMEM.x[vr72d + 20] |
| [42] | [0] | 9r | READ.F vr104 = GMEM.x[vr72d + 24] |
| [47] | [0] | 8r | READ.F vr109 = GMEM.x[vr72d + 28] |
| [13] | [0] | 8r | ADD.F vr75 = vrZero, vr74 |
| [18] | [0] | 7r | ADD.F vr80 = vr75, vr79 |
| [23] | [0] | 6r | ADD.F vr85 = vr80, vr84 |
| [28] | [0] | 5r | ADD.F vr90 = vr85, vr89 |
| [33] | [0] | 4r | ADD.F v195 = vr90, vr94 |
| [38] | [0] | 3r | ADD.F vr100 = vr95, vr99 |
| [43] | [0] | 2r | ADD.F vr105 = vr100, vr104 |
| [85] | [0] | 4r | MOV.UL vr112d = C[0][0 + 360].x |
| [48] | [0] | 3r | ADD.F vr110 = vr105, vr109 |
| [52] | [0] | 0r | WRITE.F = vr110, GMEM.x[vr112d] |
| [53] | [0] | | RET = .EXIT |
| [74] | [0] | | EB = L0 |
| [75] | [−1] | | EFUNC = F0 |

Example Program 2 (Intermediate Representation)

| Inst# | BB# | MaxLive | |
|---|---|---|---|
| [1] | [−1] | | FUNC = F0 |
| [2] | [0] | | LABEL = L0(CONV)(cohesiveid:0) |
| [77] | [0] | 2r | MOV.UL vr72d = C[0][0 + 352].x |
| [12] | [0] | 3r | READ.F vr74 = GMEM.x[vr72d] |
| [16] | [0] | 4r | READ.F vr78 = GMEM.x[vr72d + 4] |
| [20] | [0] | 5r | READ.F vr82 = GMEM.x[vr72d + 8] |
| [24] | [0] | 6r | READ.F vr86 = GMEM.x[vr72d + 12] |
| [28] | [0] | 7r | READ.F vr90 = GMEM.x[vr72d + 16] |
| [32] | [0] | 8r | READ.F vr94 = GMEM.x[vr72d + 20] |
| [36] | [0] | 9r | READ.F vr98 = GMEM.x[vr72d + 24] |
| [40] | [0] | 8r | READ.F vr102 = GMEM.x[vr72d + 28] |
| [42] | [0] | 8r | ADD.F vr104 = vrZero, vr74 |
| [43] | [0] | 7r | ADD.F vr105 = vr78, vr104 |
| [44] | [0] | 6r | ADD.F vr106 = vr82, vr105 |
| [45] | [0] | 5r | ADD.F vr107 = vr86, vr106 |
| [46] | [0] | 4r | ADD.F vr108 = vr90, vr107 |
| [47] | [0] | 3r | ADD.F vr109 = vr94, vr108 |
| [48] | [0] | 2r | ADD.F vr110 = vr98, vr109 |
| [85] | [0] | 4r | MOV.UL vr112d = C[0][0 + 360].x |
| [49] | [0] | 3r | ADD.F vr111 = vr102, vr110 |
| [52] | [0] | 0r | WRITE.F = vr111, GMEM.x[vr112d] |
| [53] | [0] | | RET = .EXIT |
| [74] | [0] | | EB = L0 |
| [75] | [−1] | | EFUNC = F0 |

The register allocation that the compiler 112 performs may thus follow the scheduling or ordering represented in the intermediate representations; for example, the register allocation for Example Program 1 may have a sequence of loads followed by a sequence of adds.

Referring further to FIG. 1, the system 100 can include at least one detector 108. The detector 108 can include any one or more rules, heuristics, functions, operations, algorithms, classifiers, models (e.g., machine learning models), or various combinations thereof, to perform operations such as automatically detecting (e.g., identifying, determining) one or more patterns of operations represented by the source code 104 for controlling allocation according to the patterns, such as to accelerate computations (e.g., reduce cycle counts for program execution) represented by the operations, including but not limited to accelerating looped computations such as matrix multiplications in loops. For example, the detector 108 can process the source code 104 to assign at least one annotation 106 to the source code 104 that identifies at least a subset of the operations for which the compiler 112 is to proceed according to an artificial dependence amongst the operations (e.g., order of operations) when performing allocation. In some implementations, the detector 108 processes the text data of the source code 104 to detect the pattern and/or identify operations of the source code 104 to use to detect the pattern; the detector 108, in various implementations, may process various representations of the source code 104 (e.g., subsequent to at least some processing by the compiler 112) to detect the pattern. The detector 108 can perform dependence analysis to detect the pattern.

The detector 108 can detect the pattern by identifying dependences (e.g., dependencies) amongst operations. The dependences can represent relationships between operations in which a first operation refers to the data of a second operation, such as where the second operation is a preceding operation and/or the execution of the second operation must precede the execution of the first operation for program correctness. For example, the detector 108 can identify dependences including true dependences, such as where the first operation is causally dependent on the second, previous statement, such as flow dependences (e.g., data dependences, read-after-write dependences, etc.) in which the first operation references a result of the second operation, such as where the second operation modifies a resource that the first operation reads and the second operation precedes the first operation in execution, or an order dependence, such as where the first operation requires a side effect of the second operation. The detector 108 can identify naming dependences, such as where two operations reference a same storage location, but there is no flow of data between the two operations (e.g., anti-dependences (such as write-after-read dependences) or output dependences (such as write-after-write dependences). The detector 108 can detect the pattern by identifying relationships between operations, such as identifying how data elements (e.g., program variables) are used by operations, including but not limited to how data element(s) outputted by a first operation are inputted by a second operation.

In some implementations, the detector 108 can detect a pattern of operations that includes (i) a first sequence of operations that includes (a) at least one first operation that depends on (b) at least one second operation and (ii) a second sequence of operations that includes (c) at least one third operation that depends on (d) at least one fourth operations, in which the first sequence of operations is independent from the second sequence of operations. For example, the detector 108 can detect one or more pairs, sequences, and/or groups of dependence relationships that include (i) a first relationship in which at least one second operation of a plurality of operations references a first subset of one or more program variables defined by at least one first operation of the plurality of operations, and (ii) a second relationship in which at least one fourth operation of the plurality of operations references a second subset of one or more program variables defined by at least one third operation, where the operations of the first relationship are independent of the operations of the second relationship. In some implementations, the detector 108 can detect the pattern and/or trigger actions described herein (e.g., assigning annotations 106 for controlling storage aliasing and/or allocation of program variables) responsive to detecting patterns having greater numbers of dependent operations in the sequences (e.g., responsive to determining that the first sequence and/or the second sequence include two or more, three or more, four or more, etc., dependently-related operations).

The detector 108 can identify features such as memory operations, computations, and/or loop instructions in the detector 108, and determine the pattern according to various such identified features. For example, the detector 108 can detect, in the source code 104, multiple sets of operations having relationships of at least one dependence between (i) at least one memory operation of the source code 104 that uses one or more data elements and (ii) at least one computation that uses the one or more data elements. In some implementations, the detector 108 identifies the memory operation as an operation that retrieves data from a global or other higher level memory or data storage, for loading into a local or other lower level memory or data storage.

The detector 108 can use any of various source code processing tools or components to detect the dependence (e.g., determine that a given line of code represents a memory operation, a computation, a loop operation, etc.), including but not limited to using components similar or identical to those used by the compiler 112, a code editor, an integrated development environment, or any of various text parsing functions, etc., to identify a type of operation represented by one or more operations or lines of code of the source code 104.

Responsive to detecting the pattern (e.g., from the structure of data flow of the source code 104), the detector 108 can determine how to direct the compiler 112 to perform allocation of program variables to storage locations based at least on the pattern, such as to determine at least one annotation 106 corresponding to the pattern for the compiler 112 to assign to the representation of the source code 104. The detector 108 can determine, responsive to detecting the pattern (e.g., based at least on the data flow from which the pattern was detected) a storage aliasing preference for how the compiler 112 is to allocate program variables to storage locations, such as for determining whether to allow the compiler 112 to allocate given program variables to the same storage locations or to cause the compiler 112 to allocate the given program variables to different storage locations, or various combinations thereof. The storage aliasing preference can include or be part of one or more rules, policies, procedures, modes, priorities, criteria, or various combinations thereof, that the compiler 112 evaluates for allocation program variables to storage locations, such as to select, from amongst multiple potential allocations, where applicable, a selected allocation that satisfies the storage aliasing preference.

The annotation 106 can include an instruction that the code optimizer 116 is implemented/configured to identify in order to modify (e.g., override) scheduling and/or rescheduling processes for allocating data elements to storage locations, according to the annotation 106. For example, the annotation 106 can control how the compiler 112 determines to allocate program variables to registers concurrently or serially, such as for allowing allocation to occur concurrently (e.g., two program variables allocated to different storage locations while the program variables are live (e.g., overlap of live ranges of the program variables)) or serially (e.g., a first program variable of the two program variables is allocated to a storage location, and subsequently a second program variable of the two program variables is allocated to the same storage location), or to require allocation to occur serially.

For example, the annotations 106 can represent pseudo-dependencies between the program variables that prevent the variables and/or operations from being aliased. For example, the annotations 106 can identify program variables that are to be assigned different storage locations (e.g., different registers, such as to have overlapping live ranges and be assigned different registers). The annotations 106 can be used to control allocation/scheduling, such as to control register footprint, register pressure, instruction level parallelism (ILP), and/or occupancy.

In some implementations, the compiler 112 assigns the annotation 106 to the representation of the source code 104 subsequent to arranging the plurality of operations in a linear order. The compiler 112 can arrange the plurality of operations in the linear order in order to subsequently allocate the plurality of operations to storage locations according to the linear order. The compiler 112 can arrange the plurality of operations based at least on the detected pattern (e.g., the detected pattern used to determine the annotation). For example, the compiler 112 can arrange the plurality of operations to cause overlap of live ranges of program variables. The live ranges can correspond to one or more points in the representation of the source code 104 in which a program variable and/or a value of a program variable is to be used at a subsequent point (e.g., subsequently in the flow of the instructions to be executed by the program of the source code 104); for example, program variables may be expected to remain allocated to storage locations while live sot that they may be used by operations while live. For example, the compiler 112 can arrange the plurality of operations responsive to determining whether to permit or prevent allocation of program variables to the same storage locations. The compiler 112 can assign the annotation 106 in between one or more operations of the linear order of operations in order to identify how to perform the allocation according to the determination of whether to permit or prevent allocation of program variables to the same storage locations.

The annotation 106 can include a variety of instructions (e.g., markers, indications, triggers) to provide to the code optimizer 116, including but not limited to (i) an instruction to identify program variables to allocate to different storage locations based on positions of the program variables in the representation of the source code 104 relative to a position of the instruction; (ii) an instruction to assign a second data element as a dependency for a first data element, so that the first and second data elements are allocated different storage locations; (iii) an instruction to indicate that any second data elements that are dependencies for a first data element are to be allocated different storage locations; or various combinations thereof. As compared with coding tools such as code barriers (which can require all operations in a section of code, prior to a position to where the code barrier is assigned, to be completed, before any operations subsequent to the position can be initiated), the annotations 106 can allow operations that are independent of the operations to which the annotations 106 are applied to be executed independently of the operations to which the annotations 106 are applied.

The detector 108 can assign the at least one annotation 106 to one or positions in the representation of the source code 104. In some implementations, the detector 108 assigns the annotation 106 to a position corresponding to a characteristic of the operations of the source code 104, such as any one or more of register footprint, register pressure, ILP, or occupancy characteristics represented by the order of operations of the source code 104. For example, the detector 108 can determine the at least one annotation 106 and/or assign the at least one annotation 106 to the one or more positions based on various criteria that may be indicative of permitting or preventing allocation of program variables to the same storage locations. The criteria can include, for example, a type of one or more operations of the plurality of operations (e.g., the type may indicate expected resource usage for performing the operation). The criteria can include an amount of storage locations provisioned by a compilation target (e.g., provisioned by computing devices 124, such as registers or stack frames provisioned by the computing devices 124). The criteria can include, for instance, a timing characteristic of one or more operations of the plurality of operations (e.g., timing for loading or processing program variables according to the instructions represented by the operations).

For example, according to any of various such criteria or combinations thereof, the detector 108 can assign the annotation to a position in the representation of the source code 104 according to at least one of (i) evaluating one or more dependency chains represented by the operations of the source code 104 or (ii) evaluating an expected execution time (e.g., latency, number of cycles, etc.) of the operations of the source code 104. For example, the detector 108 can identify, for one or more operations of the source code 104, a given data element used by the one or more operations, and can identify one or more previous operations using the given data element to identify a dependence chain (e.g., previous loads, adds, matrix multiplications, etc., the result(s) of which are used for subsequent computations, including but not limited to subsequent computations in subsequent iterations of a loop structure in the source code 104). The detector 108 can identify one or more characteristics of the given data element indicative of expected execution time, including, for example and without limitation, a size of the data element, a number of operations (e.g., basic operations, such as arithmetic operations) that the operations defined in the source code 104 use to process the data element, or a number of dependencies of the data element. Using various such characteristics, the detector 108 can assign the annotation to one or more positions in the source code 104 expected to allow for sufficient time for operations to be performed on the data elements and/or to reduce delays between when a given operation on a data element is completed and a subsequent operation can be performed (e.g., avoid allowing for cycles between when (i) a load or first computation is performed on a data element and (ii) the first computation or a second computation is performed on the data element, etc.).

Referring further to FIG. 1, the system 100 can include at least one compiler 112. The compiler 112 (including, in some instances, the code optimizer 116 of the compiler) can perform any of a variety of operations to convert source code 104 into machine code, including controlling scheduling of operations and/or allocating data elements to storage locations, according to the artificial dependences represented by the annotations 106. The compiler 112 can perform variable renaming, which can eliminate dependencies across program variables, such as by performing a static single assignment process. The compiler 112 can perform various pre-allocation transformations to determine a schedule for allocating variables to registers of the computing devices 124. The compiler 112 can (iteratively) rewrite the source code 104 and/or redetermine the schedule to satisfy various criteria, such as criteria associated with latency (e.g., hiding latency by assigning operations across multiple parallel threads), register footprint, or occupancy. The compiler 112 can map variables onto registers, stack frames, and other architectural resources of the computing devices 124. In some implementations, the compiler 112 performs various post-allocation scheduling processes, such as to allocate program variables to physical register dependencies, including but not limited to performing such processes based on ILP criteria, such as maximizing ILP.

As noted above, the compiler 112 can use the annotations 106 to determine scheduling and/or allocation, such as to assign program variables to registers according to the artificial dependences represented by the annotations 106. For example, responsive to identifying a given annotation 106 in the representation of the source code 104, the compiler 112 can allocate data elements on a same side of the annotation 106 to different storage locations of the computing devices 124 (e.g., different registers). For example, the compiler 112 can perform allocation, according to the annotations 106, such that program variables having live ranges that span the same annotation 106 are allocated to separate storage locations (e.g., compelling or otherwise causing the compiler 112 to separately allocate the program variables, such as to cause concurrency); the compiler 112 can perform allocation, according to the annotations 106, such that live ranges that are isolated by annotations 106 (e.g., in between annotations 116 as represented by the order of operations in the source code 104) may be assigned to the same or different registers (e.g., permitting either concurrent or serialized allocation of program variables).

For example, Example Program 1 is represented below in a representation of the source code 104 subsequent to at least some processing by the compiler 112 (e.g., subsequent to variable renaming, and prior to allocation to storage locations), and in which the annotations 106 are identified using the text/instruction/directive ".pragma annotation" (in various implementations, the text "annotation" may be replaced with compiler-specific terminology, such as terms that may represent how the compiler 112 is to process the annotation). As shown below, the annotations 106 can be assigned to positions in the representation of the source code 104 before each combination of load and add operations. For example, the compiler 112 can assign the instructions to the representation of the source code 104 in the manner shown below for Example Program 1 responsive to the detector 108 assigning the annotation 106 to a position in the loop that includes the load and add operations (e.g., in the for loop used to sum the values from the array 'd_in' into the 'total' variable using the 'temp' variable), such as responsive to the detector 108 positioning the annotation 106 before the load operation of the for loop.

Example Program 1 (Compiler Representation)

.reg.f32% f<17>;
.reg.b64% rd<5>;

```
ld.param.u64%                                    rd1,
    [_Z13ThreadReduce1ILi8EEvPfS0_param_0];
ld.param.u64%                                    rd2,
    [_Z13ThreadReduce1ILi8EEvPfS0_param_1];
cvta.to.global.u64% rd3, % rd1;
.pragma annotation;
ld.global.f32% f1, [% rd3];
add.f32% f2, % f1, 0f00000000;
.pragma annotation;
ld.global.f32% f3, [% rd3+4];
add.f32% f4, % f2, % f3;
.pragma annotation;
ld.global.f32% f5, [% rd3+8];
add.f32% f6, % f4, % f5;
.pragma annotation;
ld.global.f32% f7, [% rd3+12];
add.f32% f8, % f6, % f7;
.pragma annotation;
ld.global.f32% f9, [% rd3+16];
add.f32% f10, % f8, % f9;
.pragma annotation;
ld.global.f32% f11, [% rd3+20];
dd.f32% f12, % f10, % f11;
.pragma annotation;
d.global.f32% f13, [% rd3+24];
add.f32% f14, % f12, % f13;
.pragma annotation;
ld.global.f32% f15, [% rd3+28];
add.f32% f16, % f14, % f15;
cvta.to.global.u64% rd4, % rd2;
st.global.f32[% rd4], % f16;
ret;
```

As another example, Example Program 2 is shown below in a representation of the source code 104 (e.g., at the same stage of processing as shown immediately above for Example Program 1), in which the compiler 112 has assigned the ".pragma annotation" instruction in between a series of load operations and a series of add operations. For example, the compiler 112 can assign the annotation 106 between the load operations and the add operations responsive to the detector 108 assigning the annotation 106 between the first for loop in Example Program 2 that loads the data from the 'd_in' array variable into the 'temps' variable and the second for loop in Example Program 2 that accumulates the data from automatic storage into the 'total' variable.

Example Program 2 (Compiler Representation)

```
.reg.f32% f<17>;
.reg.b64% rd<5>;
ld.param.u64%                                    rd1,
    [_Z13ThreadReduce2ILi8EEvPfS0_param_0];
ld.param.u64%                                    rd2,
    [_Z13ThreadReduce2ILi8EEvPfS0_param_1];
cvta.to.global.u64% rd3, % rd1;
ld.global.f32% f1, [% rd3];
ld.global.f32% f2, [% rd3+4];
ld.global.f32% f3, [% rd3+8];
ld.global.f32% f4, [% rd3+12];
ld.global.f32% f5, [% rd3+16];
ld.global.f32% f6, [% rd3+20];
ld.global.f32% f7, [% rd3+24];
ld.global.f32% f8, [% rd3+28];
.pragma annotation;
cvta.to.global.u64% rd4, % rd2;
add.f32% f9, % f1, 0f00000000;
add.f32% f10, % f9, % f2;
add.f32% f11, % f10, % f3;
add.f32% f12, % f11, % f4;
add.f32% f13, % f12, % f5;
add.f32% f14, % f13, % f6;
add.f32% f15, % f14, % f7;
add.f32% f16, % f15, % f8;
st.global.f32[% rd4], % f16;
ret;
```

Referring further to FIG. 1, responsive to processing the representation of the source code 104 using the annotations 106, the compiler 112 can allocate program variables to computing devices 124, such as to facilitate execution of machine code. For example, the compiler 112 can include an instruction scheduler (e.g., operation scheduler) that allows for the computing devices 124 to execute operations as represented by machine code, including by using the program variables as allocated to the storage locations. The compiler 112 may allow the annotations 106 to be discarded subsequent to allocation, such as to allow the instruction scheduler to schedule instructions according to various criteria (though the scheduling of instructions may, as a result of the order in which the program variables are allocated, be affected by the allocation). The machine code can include any of a variety of machine-readable code data structures, such as non-executable (e.g., object code) and/or executable (e.g., executable machine code, binaries, fatbins (e.g., binaries having additional data), executable files), or various combinations thereof.

As depicted in FIG. 1, the system 100 can include one or more computing devices 124. The computing devices 124 can include any of a variety of computer processing hardware configured to execute the machine code, including, for example and without limitation, hardware tuned or otherwise configured for generating graphics, such as display data; GPUs; hardware including architectural resources for parallel processing; hardware including multiple processing cores; or various combinations thereof. As described above, the computing devices 124 can include or be coupled with various data storage components having storage locations, including registers, stack frames, local memory, global memory, and/or hard disk storage devices; the computing devices 124 can process executable instructions in the machine code using the data storage components, such as to process the executable instructions in view of performance considerations including but not limited to instruction level parallelism; memory parallelism; memory occupancy; register footprint management; energy/power/heat management; or various combinations thereof. The computing devices 124 can execute multiple threads (e.g., multiple warps) of instructions, such as by executing one or more threads of instructions in each processing core. The computing devices 124 can assign instructions to the threads and/or the processing cores for execution by the processing cores according to the machine code, such as to assign the instructions according to an order represented by the order of operations in the machine code.

Figure 2:
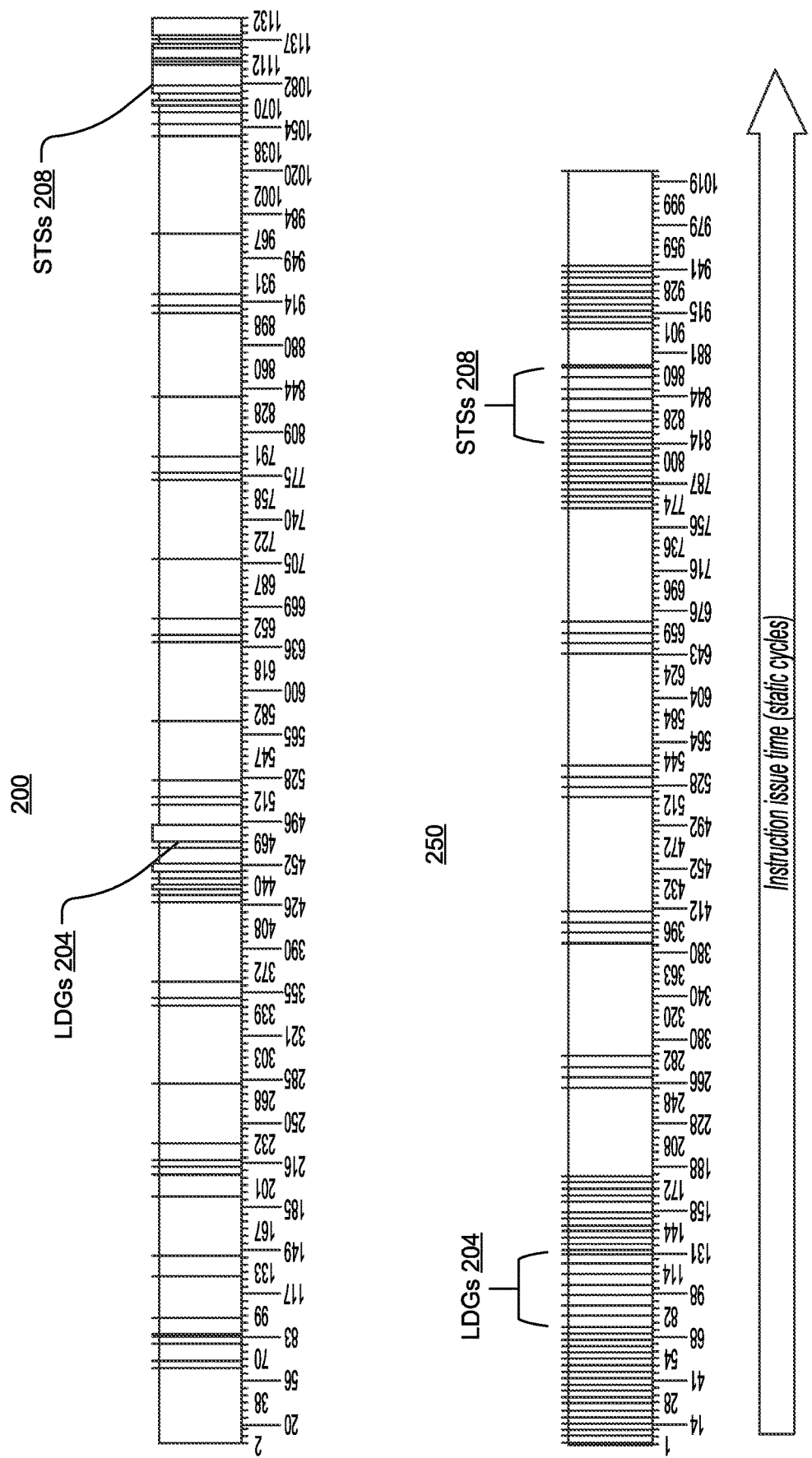
FIG. 2 depicts example charts of cycles of executions of programs, in accordance with some embodiments of the present disclosure.

FIG. 2 depicts an example of a chart 200 of cycles of execution of a program, and an example of a chart 250 of cycles of execution of a program in which the machine code for the program results from application of artificial dependences to control storage aliasing (e.g., using the detector 108 to control how the compiler 112 allocates program variables to registers or stack frames). The program can correspond to eight stages of operations, each including four load operations to load data for 64 computations, such as half precision matrix multiply-accumulate computations (HMMAs).

As shown in chart 200, executing the program can use approximately 1150 clock cycles. For instance, in the execution shown in chart 200, operations such as loading from global memory (LDG) operations 204 are performed several hundred cycles into execution, which can result in operations that depend on the data from the global memory being delayed from execution; operations such as store within local or shared window (STS) operations 208, which may use relatively long durations of cycles, are bunched towards the end of execution.

As shown in chart 250, executing the program (e.g., executing the program that was generated as a result of applying artificial dependences for allocating program variables to registers or stack frames) can use fewer clock cycles, such as approximately 1020 clock cycles. As compared with the execution shown in chart 200, in the execution shown in chart 250, the LDG operations 204 and STS operations 208 are each performed closer to the start of execution, allowing the system 100 to more efficiently use the parallel processing resources of the computing devices 124. As such, by controlling storage aliasing according to detection of patterns indicative of artificial dependences, the system 100 can more effectively execute the machine code.

Figure 3:
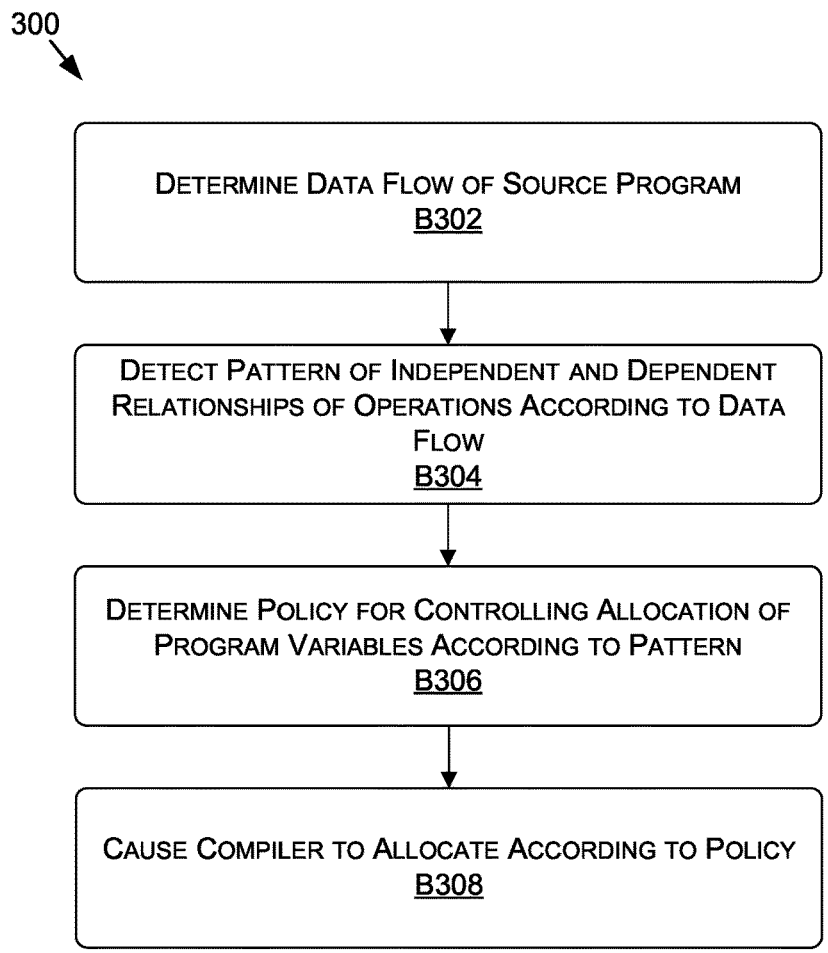
FIG. 3 is a flow diagram of an example of a method for storage aliasing during program compilation, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the systems of FIG. 1 and FIG. 2. However, this method 300 may additionally or alternatively be executed by any one system, or any combination of systems, including, but not limited to, those described herein.

FIG. 3 is a flow diagram showing a method 300 for storage aliasing via automatic application of artificial dependences during program compilation, such as for accelerating execution of computer code by GPUs and other computer architectures, in accordance with some embodiments of the present disclosure. Various operations of the method 300 can be implemented by the same or different devices or entities at various points in time. For example, one or more first devices may implement operations relating to detecting data flow having independent sets of dependently related operations in source code representations and assigning instructions to the source code representations to cause a compiler to perform allocation according to the detected data flow, and one or more second devices, such as a GPU, may implement operations such as executing machine code generated from the source code representations.

The method 300, at block B302, includes determining, using a source program that includes a plurality of operations, a structure of data flow of the plurality of operations. The data flow (and the structure thereof) can be determined using any of various data flow and/or dependence analysis processes. For example, the data flow can be determined by evaluating how program variables associated with the plurality of operations are used by various operations, such as by identifying which operations define, reference, and/or manipulate (e.g., perform computations on) the program variables, and/or an order in which the program variables are used. Determining the data flow can include determining dependence relationships amongst the plurality of operations. The source program can include source code or a representation thereof. For example, the representation of source code can include text indicating source code or a modified representation of source code, such as a modified representation responsive to at least some processing of the source code by a compiler, such as renaming of variables or other modifications that may be performed prior to allocating program variables to storage locations of computing resources. The operations can include any of a variety of operations for retrieving, fetching, loading, and/or storing one or more data elements from or to various data storage components, such as GPU registers, local memory, shared memory, global memory, or various combinations thereof. The operations can include compute operations such as arithmetic operations, vector or matrix operations (e.g., matrix multiplication), or various combinations thereof, including but not limited to one or more matrix multiply and accumulate (MMA) operations.

The method 300, at block B304, includes detecting, based at least on the structure of data flow, independent sets (e.g., sequences, pairs, groups) of dependence relationships. The dependence relationships can correspond to multiple operations that use (e.g., define, reference, and/or manipulate, etc.) one or more same program variables. The operations of each independent set can be independent in that they may not depend on each other and/or the same program variables; for example, operations of one set can be executed correctly without preceding execution of operations of the other set.

The method 300, at block B306, includes determining, based at least on the structure of the data flow, a policy (e.g., storage aliasing preference, etc.) for controlling how a compiler performs allocation of the program variables, such as how artificial dependences may be used to control allocation. Determining the policy can include determining an annotation to assign to the program that corresponds to the policy. For example, the annotation can indicate artificial dependences amongst at least some of the program variables and/or operations, such as to make one or more first operations precede one or more second operations (e.g., even if the second operations are independent from the first operations), such as to control when program variables used by the first operations are allocated relative to when program variables used by the second operations are allocated. For example, the annotation can cause a compiler to be required to allocate program variables to different storage locations, or to allow the compiler to determine to allocate program variables to the same or different storage locations. In some implementations, the annotation is assigned, as a compiler-readable label, such as an annotation or directive, to a representation of the source code, such as to be assigned to a selected position in the representation. The representation can include, for example, a representation subsequent to the compiler arranging the operations in a linear order (e.g., an order that has overlap(s) of live ranges of program variables according to the annotation). The selected position can be selected according to the annotation, such as to indicate artificial dependences amongst operations according to the selected position. For example, the compiler can be allowed to allocate program variables to the same storage locations by positioning the annotation to separate (1) a second operation, in one of the independent sequences, that references a program variable defined by a first operation of the sequence, from a third operation that defines a program variable of the other independent sequence, and/or (2) a fourth operation, in the other independent sequence, from the first operation. The compiler can be caused to prevent allocation of program variables to the same storage locations (e.g., cause allocation to different storage locations) by positioning the annotation to separate the first operation from the third operation and the second operation from the fourth operation. The annotation can be processed by the compiler upon allocation of program variables to storage locations (and may be discarded subsequent to the allocation, such as to allow an instruction scheduler to operate according to nominal or default criteria regardless of where the annotations are assigned, such as a timing criterion for executing operations).

Determining whether to permit or allow program variables (from independently-related sequences of operations) to be allocated to the same or different storage locations can be determined according to any of various criteria or combinations thereof. The criteria can include, for example and without limitation, (i) a type of one or more operations of the plurality of operations, (ii) a quantity of processor storage locations provisioned by a compilation target, or (iii) a timing characteristic of one or more operations of the plurality of operations. The artificial dependence can be defined according to the determination, such as to indicate or imply a storage aliasing preference according to one or more such criteria.

The method 300, at block B308, includes allocating, by the compiler according to the annotation, the program variables to storage locations. For example, the compiler can identify storage locations provisioned by a compilation target, such as storage locations of one or more computing devices (e.g., parallel computing systems, GPUs). The storage locations can include registers. The storage locations can include stack frames. The compiler can allocate the program variables by selecting, from amongst the identified storage locations, a given storage location for allocating each program variable in accordance with the annotation and/or the annotation. For example, the compiler can process the artificial dependence represented by the annotation in a same or similar manner as dependences amongst operations required for program correctness, such as to cause (or not cause) overlap of live ranges of program variables according to the artificial dependence. The compiler can allow the annotations to be discarded or otherwise not used subsequent to allocation, such as to allow an instruction scheduler to direct operations to processors for execution using criteria independent of the annotations.

Example Content Streaming System

Figure 4:
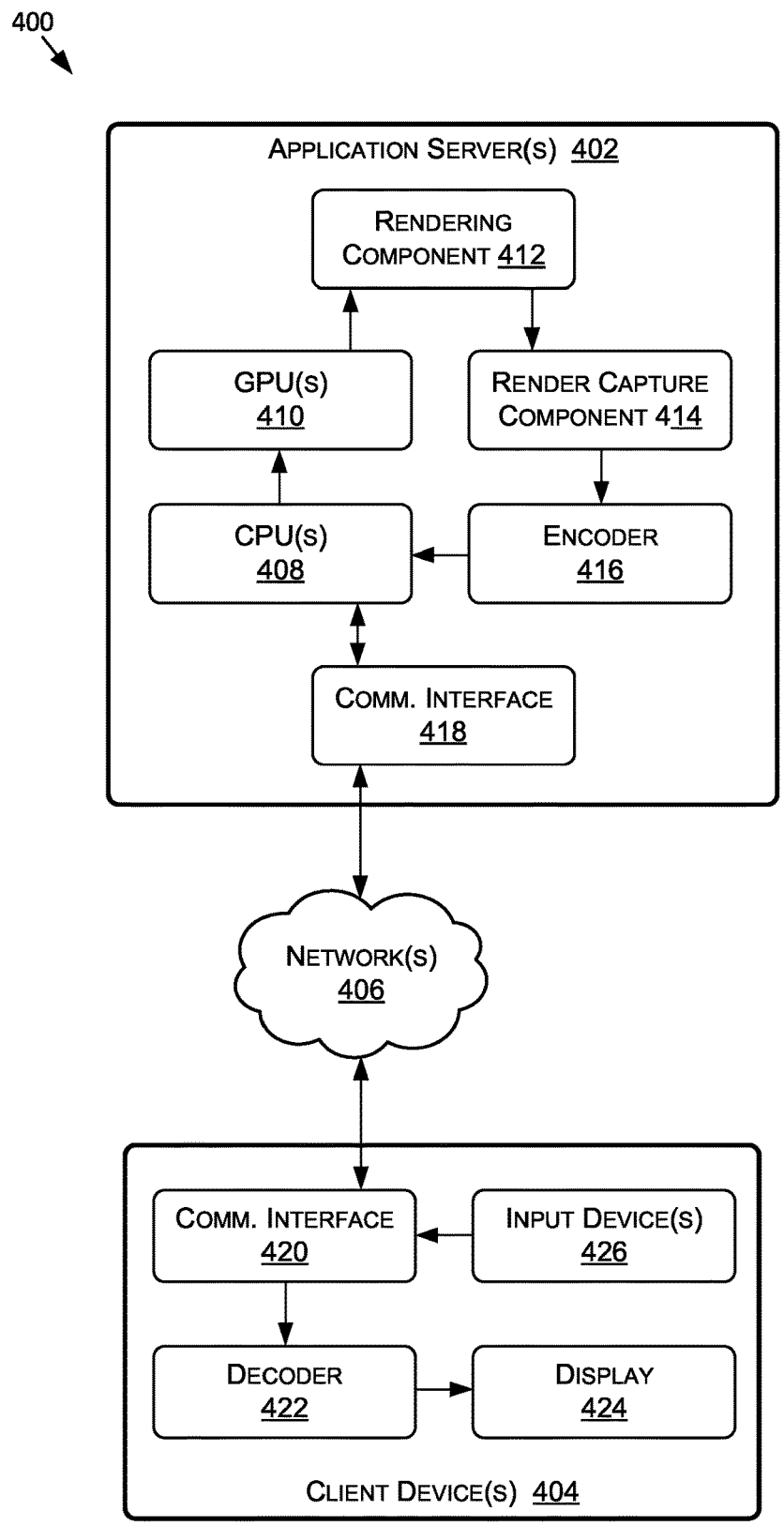
FIG. 4 is a block diagram of an example content streaming system suitable for use in implementing some embodiments of the present disclosure.

Now referring to FIG. 4, FIG. 4 is an example system diagram for a content streaming system 400, in accordance with some embodiments of the present disclosure. FIG. 4 includes application server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network(s) described herein). In some embodiments of the present disclosure, the system 400 may be implemented to perform diffusion model training and runtime operations. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 400 can be implemented to detect dependences and other target features of source code and automatically assign instructions for scheduling and/or allocation of compute resources according to the instructions, such as described with reference to system 100 of FIG. 1.

In the system 400, for an application session, the client device(s) 404 may only receive input data in response to inputs to the input device(s), transmit the input data to the application server(s) 402, receive encoded display data from the application server(s) 402, and display the display data on the display 424. As such, the more computationally intense computing and processing is offloaded to the application server(s) 402 (e.g., rendering—in particular ray or path tracing—for graphical output of the application session is executed by the GPU(s) of the game server(s) 402). In other words, the application session is streamed to the client device(s) 404 from the application server(s) 402, thereby reducing the requirements of the client device(s) 404 for graphics processing and rendering.

For example, with respect to an instantiation of an application session, a client device 404 may be displaying a frame of the application session on the display 424 based on receiving the display data from the application server(s) 402. The client device 404 may receive an input to one of the input device(s) and generate input data in response, such as to provide modification inputs of a driving signal for use by modifier 112. The client device 404 may transmit the input data to the application server(s) 402 via the communication interface 420 and over the network(s) 406 (e.g., the Internet), and the application server(s) 402 may receive the input data via the communication interface 418. The CPU(s) 408 may receive the input data, process the input data, and transmit data to the GPU(s) 410 that causes the GPU(s) 410 to generate a rendering of the application session. For example, the input data may be representative of a movement of a character of the user in a game session of a game application, firing a weapon, reloading, passing a ball, turning a vehicle, etc. The rendering component 412 may render the application session (e.g., representative of the result of the input data) and the render capture component 414 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 402. In some embodiments, one or more virtual machines (VMs)—e.g., including one or more virtual components, such as vGPUs, vCPUs, etc.—may be used by the application server(s) 402 to support the application sessions. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424, such as to display a top-down/BEV map of a scene or an environment.

Example Computing Device

Figure 5:
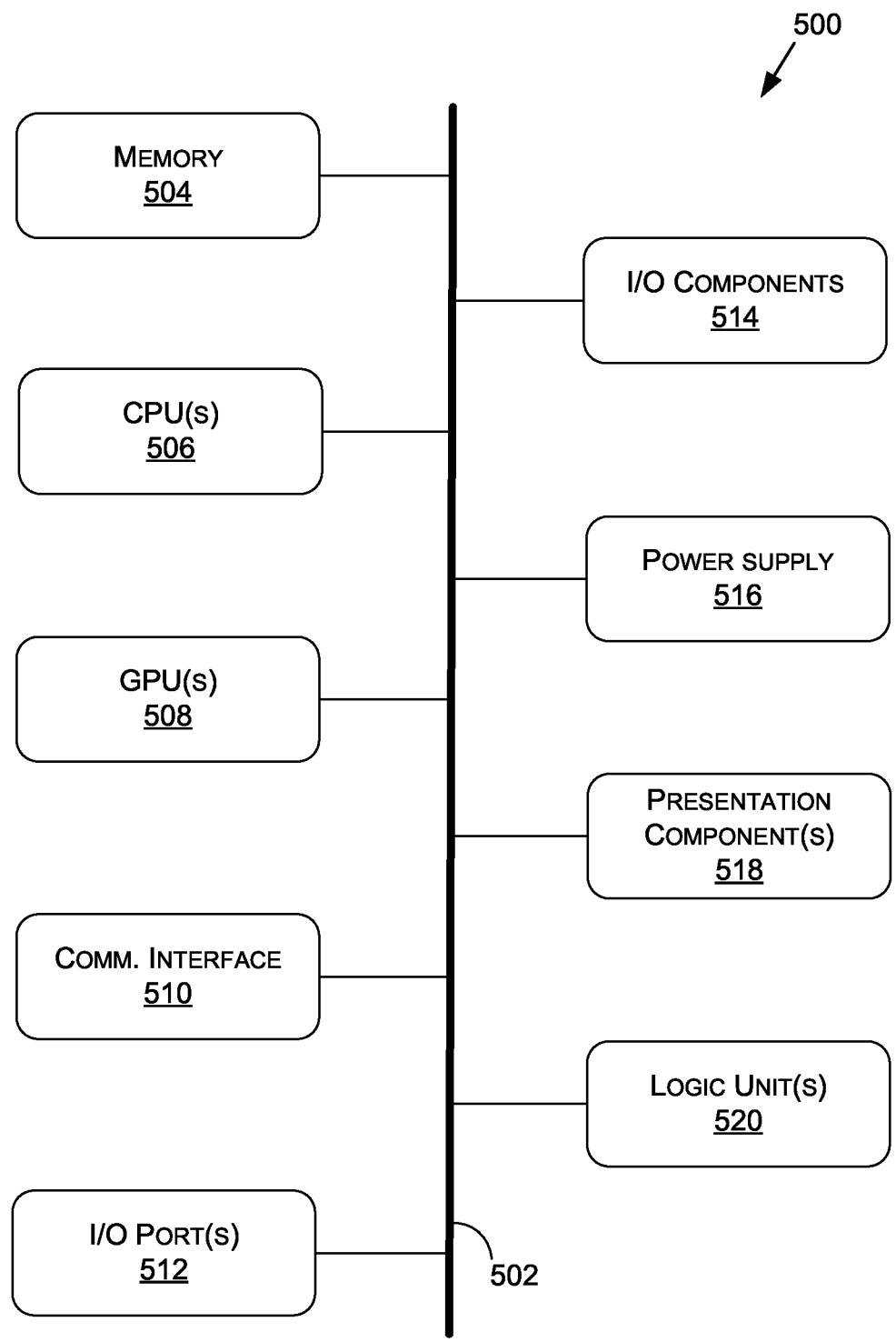
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may be arranged in various topologies, including but not limited to bus, star, ring, mesh, tree, or hybrid topologies. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU), such as to implement one or more operations described with reference to the system 100. The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that allow the computing device 500 to communicate with other computing devices via an electronic communication network, included wired and/or wireless communications. The communication interface 510 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508. In some embodiments, a plurality of computing devices 500 or components thereof, which may be similar or different to one another in various respects, can be communicatively coupled to transmit and receive data for performing various operations described herein, such as to facilitate latency reduction.

The I/O ports 512 may allow the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that allow detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to allow the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
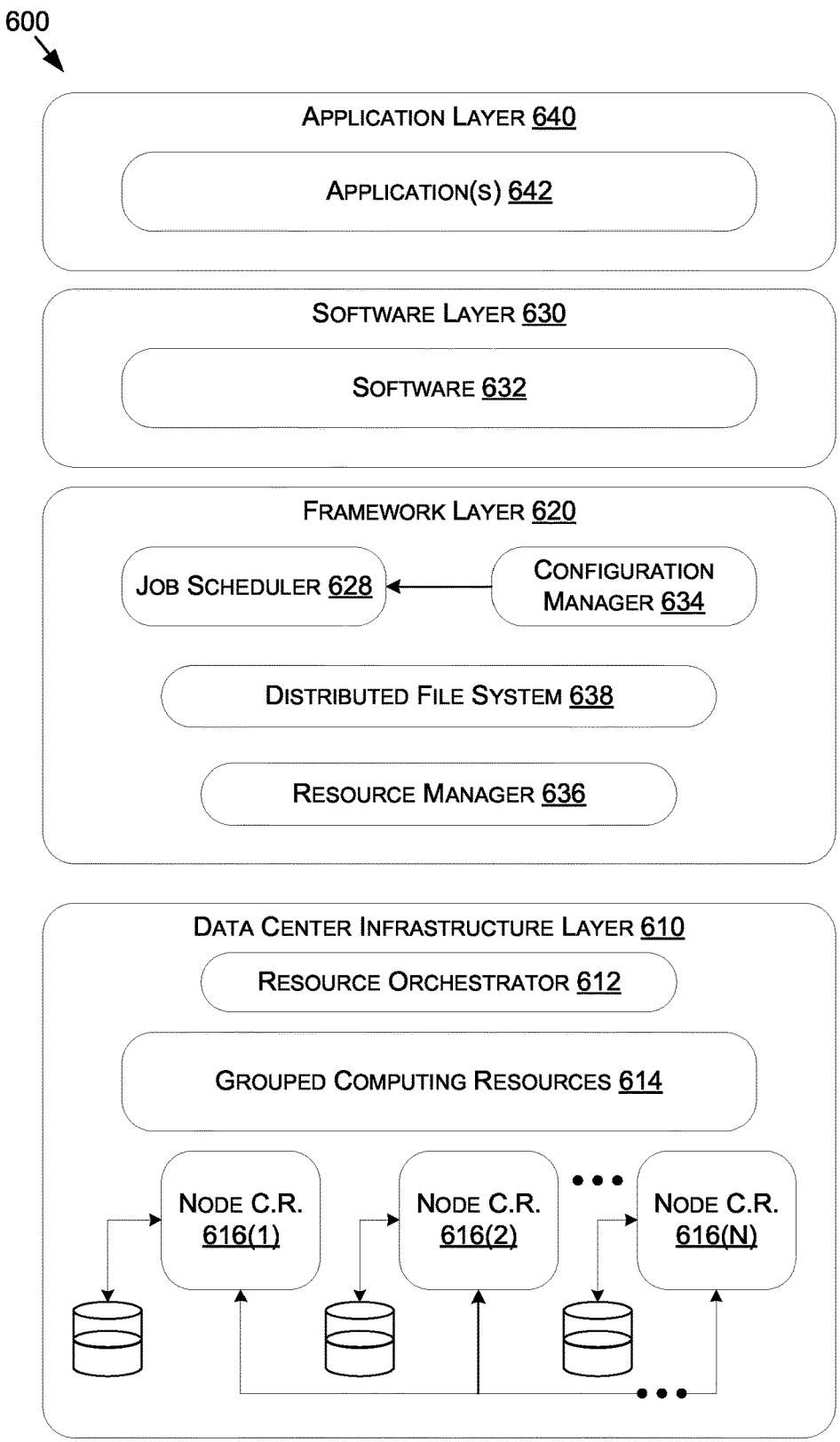
FIG. 6 is a block diagram of an example data center suitable for use in implementing some embodiments of the present disclosure.

FIG. 6 illustrates an example data center 600 that may be used in at least one embodiments of the present disclosure, such as to implement the systems 100, 200 in one or more examples of the data center 600. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 628, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 628 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 628. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), simulation software for rendering and updating simulated or virtual environments and/or other machine learning applications used in conjunction with one or more embodiments, such as to train, configure, update, and/or execute machine learning models.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein, including but not limited to for implementing detector 108. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits to:
determine, based at least on a source program comprising a plurality of operations, a structure of data flow of the plurality of operations;
detect, based at least on the structure of data flow, at least one pair of dependence relationships among the plurality of operations comprising (i) a first relationship in which at least one second operation of the plurality of operations references a first subset of one or more program variables defined by at least one first operation of the plurality of operations, and (ii) a second relationship in which at least one fourth operation of the plurality of operations references a second subset of one or more program variables defined by at least one third operation, and (iii) wherein the plurality of operations of the first relationship are independent of the plurality of operations of the second relationship;
determine, based at least on the structure of data flow, a storage aliasing preference for a compiler to (a) be allowed to allocate the first subset of one or more program variables to a plurality of first processor storage locations and to allocate the second subset of one or more program variables to the plurality of first processor storage locations, or (b) allocate the first subset of one or more program variables to the plurality of first processor storage locations and allocate the second subset of one or more program variables to a plurality of second processor storage locations different from the plurality of first processor storage locations;
  apply, to the source program, at least one artificial dependence among the plurality of operations of the first relationship and the second relationship that indicates the storage aliasing preference; and
  allocate, using the compiler and according to the at least one artificial dependence, the first subset of one or more program variables and the second subset to one or more processor storage locations of the plurality of first processor storage locations and the plurality of second processor storage locations.

2. The processor of claim 1, wherein the at least one first operation comprises a plurality of first operations.

3. The processor of claim 1, wherein the at least one second operation comprises a plurality of second operations.

4. The processor of claim 1, wherein the one or more circuits are to:
  arrange the plurality of operations in a linear order to have an overlap of a live range of a plurality of program variables of the one or more program variables, wherein the overlap corresponds to the storage aliasing preference; and
  assign, responsive to arranging the plurality of operations in the linear order, at least one annotation representing the at least one artificial dependence as an artificial ordering dependence amongst the linear order to cause the compiler to allocate, according to the storage aliasing preference, the first subset of one or more program variables and the second subset of one or more program variables.

5. The processor of claim 4, wherein the one or more circuits are to allow the compiler to allocate the first subset of one or more program variables to the plurality of first processor storage locations and to allocate the second subset of one or more program variables to the plurality of first processor storage locations by assigning the at least one annotation to separate at least one of (a) the at least one second operation from the at least one third operation or (b) the at least one first operation from the at least one fourth operation.

6. The processor of claim 4, wherein the one or more circuits are to cause the compiler to allocate the first subset of one or more program variables to the plurality of first processor storage locations and to allocate the second subset of one or more program variables to the plurality of second processor storage locations by assigning the at least one annotation to separate the at least one first operation from the at least one third operation and separate the at least one second operation from the at least one fourth operation.

7. The processor of claim 1, wherein the one or more circuits are to cause the compiler to discard the artificial dependence subsequent to performing the allocation.

8. The processor of claim 7, wherein the compiler is to modify an order of the plurality of operations, according to a timing criterion for execution operations, subsequent to performing the allocation.

9. The processor of claim 1, wherein the plurality of first processor storage locations and the plurality of second processor storage locations are provisioned by a compilation target, wherein the plurality of first processor storage locations and the plurality of second processor storage locations comprise a plurality of registers.

10. The processor of claim 1, wherein the plurality of first processor storage locations and the plurality of second processor storage locations are provisioned by a compilation target, wherein the plurality of first processor storage locations and the plurality of second processor storage locations comprise a plurality of locations in a stack frame.

11. The processor of claim 1, wherein the one or more circuits are to determine the storage aliasing preference according to at least one of (i) a type of one or more operations of the plurality of operations, (ii) a quantity of processor storage locations provisioned by a compilation target, or (iii) a timing characteristic of one or more operations of the plurality of operations.

12. The processor of claim 1, wherein the compiler is to perform the allocation to a compilation target comprising a graphics processing unit (GPU) configured to execute the plurality of operations.

13. The processor of claim 1, wherein the plurality of operations comprises a matrix-matrix multiplication, and the one or more circuits are to determine the storage aliasing preference according to a schedule of load operations and multiplication operations of the matrix-matrix multiplication.

14. The processor of claim 1, wherein the source program comprises at least one of a source code file or a data structured generated by processing of the source code file by the compiler.

15. The processor of claim 1, wherein the processor is comprised in at least one of:
  a control system for an autonomous or semi-autonomous machine;
  a perception system for an autonomous or semi-autonomous machine;
  a system for performing simulation operations;
  a system for performing digital twin operations;
  a system for performing light transport simulation;
  a system for performing generative artificial intelligence (AI) operations;
  a system for performing collaborative content creation for three-dimensional (3D) assets;
  a system for performing deep learning operations;
  a system implemented using an edge device;
  a system implemented using a robot;
  a system implemented using a language model;
  a system for performing conversational AI operations;
  a system for generating synthetic data;
  a system incorporating one or more virtual machines (VMs);
  a system implemented at least partially in a data center; or
  a system implemented at least partially using cloud computing resources.

16. A system comprising:
  one or more hardware processing units configured to execute operations including:
    determining, based at least on a source program comprising a plurality of operations, a data flow of the plurality of operations;
    detecting, based at least on the data flow, at least one pair of dependence relationships among the plurality of operations comprising (i) a first relationship in which at least one second operation of the plurality of operations references a first subset of one or more program variables defined by at least one first operation of the plurality of operations, and (ii) a second relationship in which at least one fourth operation of the plurality of operations references a second subset of one or more program variables defined by at least one third operation, and (iii) wherein the plurality of operations of the first relationship are independent of the plurality of operations of the second relationship;

determining, based at least on the at least one pair of dependence relationships, a procedure for a compiler to (a) be allowed to allocate the first subset of one or more program variables to a plurality of first processor storage locations and to allocate the second subset of one or more program variables to the plurality of first processor storage locations, or (b) allocate the first subset of one or more program variables to the plurality of first processor storage locations and allocate the second subset of one or more program variables to a plurality of second processor storage locations different from the plurality of first processor storage locations;

applying, to a representation of the source program, at least one artificial dependence among the plurality of operations of the first relationship and the second relationship that indicates the procedure; and allocating, using the compiler and according to the at least one artificial dependence, the first subset of one or more program variables and the second subset to one or more processor storage locations of the plurality of first processor storage locations and the plurality of second processor storage locations.

17. The system of claim 16, wherein the one or more processing units are to:

arrange the plurality of operations in a linear order to have an overlap of a live range of a plurality of program variables of the one or more program variables, wherein the overlap corresponds to the procedure; and assign, responsive to arranging the plurality of operations in the linear order, at least one annotation representing the at least one artificial dependence as an artificial ordering dependence amongst the linear order to cause the compiler to allocate, according to the procedure, the first subset of one or more program variables and the second subset of one or more program variables.

18. The system of claim 16, wherein the system is comprised in at least one of:
 a system for performing simulation operations;
 a system for performing digital twin operations;
 a system for performing generative artificial intelligence (AI) operations;
 a system for performing light transport simulation;
 a system for performing collaborative content creation for three-dimensional (3D) assets;
 a system for performing deep learning operations;
 a system implemented using an edge device;
 a system implemented using a robot;
 a control system for an autonomous or semi-autonomous machine;
 a perception system for an autonomous or semi-autonomous machine;
 a system implemented using a language model;
 a system for performing conversational AI operations;
 a system for generating synthetic data;
 a system incorporating one or more virtual machines (VMs);
 a system implemented at least partially in a data center; or
 a system implemented at least partially using cloud computing resources.

19. A method, comprising:

determining, by one or more processors, using a source program comprising a plurality of operations, a data flow of the plurality of operations;

detecting, by the one or more processors, based at least on the data flow, at least one pair of dependence relationships among the plurality of operations comprising (i) a first relationship in which at least one second operation of the plurality of operations references a first subset of one or more program variables defined by at least one first operation of the plurality of operations, and (ii) a second relationship in which at least one fourth operation of the plurality of operations references a second subset of one or more program variables defined by at least one third operation, and (iii) wherein the plurality of operations of the first relationship are independent of the plurality of operations of the second relationship;

determining, based at least on the structure of data flow, a storage aliasing policy for a compiler to (a) be allowed to allocate the first subset of one or more program variables to a plurality of first processor storage locations of a target hardware and to allocate the second subset of one or more program variables to the plurality of first processor storage locations, or (b) allocate the first subset of one or more program variables to the plurality of first processor storage locations and allocate the second subset of one or more program variables to a plurality of second processor storage locations of the target hardware different from the plurality of first storage locations;

introducing at least one artificial dependence among the plurality of operations of the first relationship and the second relationship that indicates the storage aliasing policy; and allocating, using the compiler and according to the at least one artificial dependence, the first subset of one or more program variables and the second subset to one or more processor storage locations of the plurality of first processor storage locations and the plurality of second processor storage locations.

20. The method of claim 19, further comprising modifying, by the one or more processors using the compiler, an order of the plurality of operations, according to a timing criterion for execution of the plurality of operations, subsequent to performing the allocation.

* * * * *